United States Patent [19]
Bernard et al.

[11] Patent Number: 5,111,040
[45] Date of Patent: May 5, 1992

[54] PHOTOELECTRIC DEVICE FOR POSITION MEASURING

[75] Inventors: Harald Bernard, Waldkraiburg; Alfons Spies, Seebruck, both of Fed. Rep. of Germany

[73] Assignee: Dr. Johannes Heidenhain GmbH, Traunreut, Fed. Rep. of Germany

[21] Appl. No.: 667,885

[22] Filed: Mar. 12, 1991

[30] Foreign Application Priority Data

Mar. 13, 1990 [DE] Fed. Rep. of Germany ....... 4007967

[51] Int. Cl.$^5$ .......................... H01J 3/14; G01B 11/02
[52] U.S. Cl. .................................. 250/237 G; 356/356
[58] Field of Search ......... 250/237 G, 231.14, 231.16; 356/356

[56] References Cited
U.S. PATENT DOCUMENTS

| | | | |
|---|---|---|---|
| 4,577,101 | 3/1986 | Bremer | 250/231.16 |
| 4,792,678 | 10/1987 | Spies . | |
| 4,868,385 | 9/1989 | Nishimura | 250/231.16 |
| 4,975,571 | 12/1990 | McMurtry et al. | 250/231.16 |
| 4,988,864 | 1/1991 | Michel et al. | 356/356 |

OTHER PUBLICATIONS

"Laser Rotary Encoders", Nishimura et al., Motion, Jul./Aug. 1986, pp. 3-4.
"Laser Rotary Encoders," Nishimura et al., Motion Sep./Oct. 1986, pp. 14-18.
"Photoelectrical Measurement of the Change of Lengths or Angular Positions with the Help of Diffraction Lattices", Hock, Dissertation Approved by the University of Stuttgart, Submitted 10/29/75, pp. 183-184.

Primary Examiner—Bruce C. Anderson
Attorney, Agent, or Firm—Willian Brinks Olds Hofer Gilson & Lione

[57] ABSTRACT

The angular graduation of a graduated disk is scanned in a measuring device by a scanning unit by the movement of light beams in two angular graduation areas located diametrically opposite each other. To compensate for wobble errors caused by the wobbling of the graduated disk, the light beam emanating from a light source impinges on the graduated disk at a point outside of the angular graduation and, following reflection and deflection by a triple prism, impinges parallel to itself in the form of a light beam on an impact point in a first the graduation area. The light beam is split into two diffraction beams by the graduation, and meet, after having passed through a deflection prism, at a meeting point in a second angular graduation area. Since the impact point and the meeting point are always located on the same radius, the wobbling of the disk does not have a disadvantageous effect on the accuracy of measurement.

9 Claims, 2 Drawing Sheets

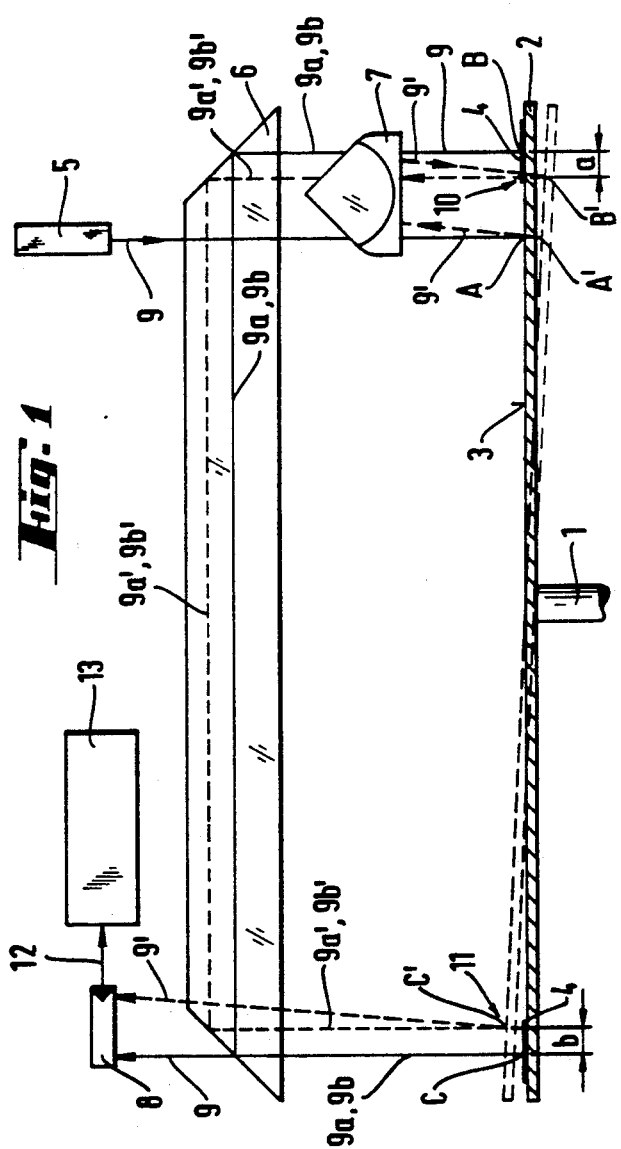
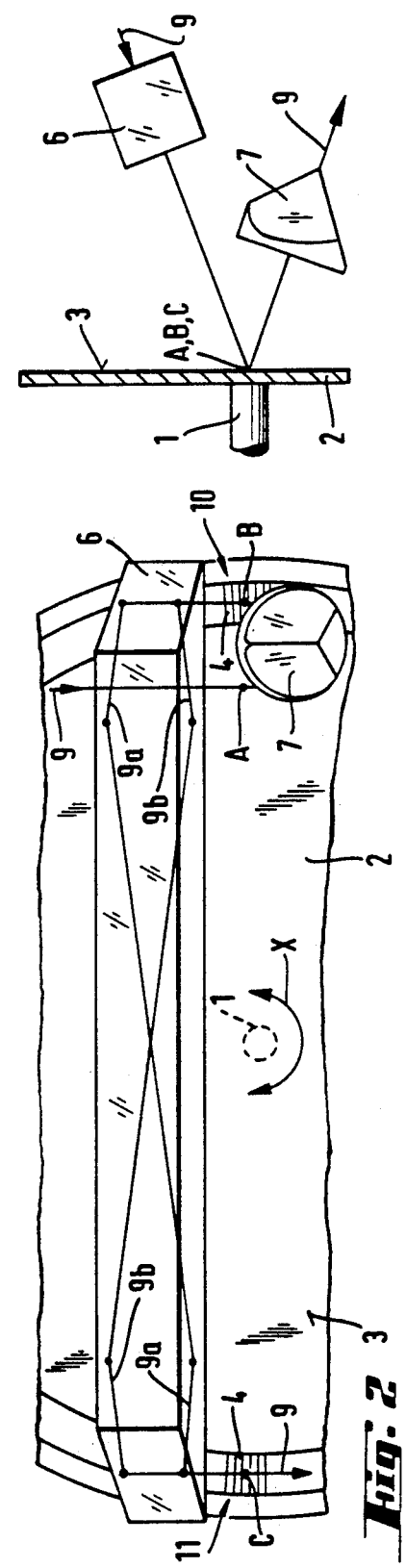

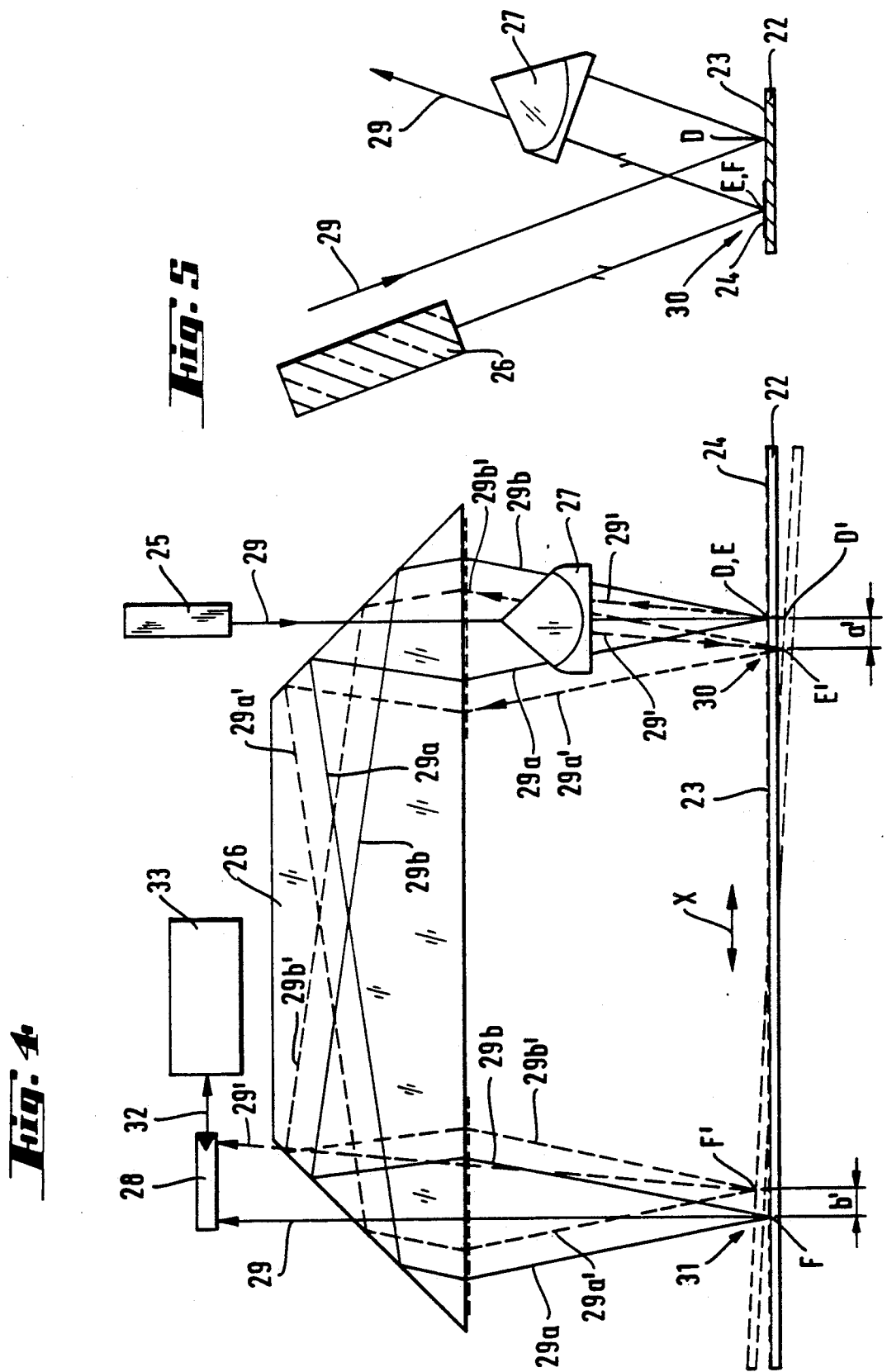

PHOTOELECTRIC DEVICE FOR POSITION MEASURING

BACKGROUND OF THE INVENTION

1. Field of the Invention

The invention relates to a photoelectric position measuring device for measuring the relative position of two objects which are movable with respect to each other, wherein a graduation scale connected with one object is scanned by means of a scanning unit connected with the other object, wherein two diffraction beams of one order emanating from a first graduation area meet in a second graduation area under the same associated diffraction angles.

2. Description of the Prior Art

Position measuring devices in the form of either a length-measuring device or an angle-measuring device are employed for measuring the relative position of two objects, for example, a machine tool with respect to a workpiece to be processed by the machine tool.

For example, U.S. Pat. No. 4,792,678 based upon German Letters Patent DE-PS 36 33 574 discloses a photoelectric angle-measuring device for measuring the angular position of two objects which can be turned towards each other. The incremental angular graduation of a rotatable graduated scale connected with one object is scanned by a scanning unit connected with the other object. The scanning unit comprises a light source, a deflecting prism and a photoelectric cell. A beam of light emanating from the light source impacts a first angular graduation area of the angular graduation which is in the form of a phase grid. The beam of light is split by the angular graduation into a positive diffraction beam of the first order with a positive diffraction angle and a negative diffraction beam of the first order with a negative diffraction angle. After having been twice deflected by the deflection prism, the two diffraction beams combine again under two equal associated diffraction angles in a second angular graduation area, which is located diametrically opposite from the first angular graduation area. The two diffraction beams interfere in the second angular graduation area and impact a photoelectric cell to generate a scanning signal, from which the measured values regarding the angular position of the objects are derived. This double scanning of the angular graduation in two angular graduation areas, located diametrically opposite from each other, by means of diffraction of light beams eliminates eccentricity errors which are caused by the eccentricity between the angular graduation and the rotating shaft of the graduated scale which are practically always present. Inaccurate measurements result from such eccentricity errors.

Errors are also introduced by the wobbling of the graduation disk caused by the not exact vertical mounting of the graduated scale on the rotating shaft. Increased demands made on the accuracy of measurement, however, no longer permit the tolerance of wobbling errors in angular measurements. Because of the wobbling of the graduated scale, the meeting point of the two diffraction beams in the second angular graduation area wanders in tangential and radial directions. The result is that the impact point of the light beam emanating from the light source in the first angular graduation area and the meeting point of the two diffraction beams in the second angular graduation area are no longer located on the same radius. Because the grid constant of the incremental angular graduation depends on the radius, different grid constants are therefore being scanned in the two angular graduation areas resulting in inaccurate measurements.

The same problems correspondingly occur in the form of tip errors in length measuring devices using the same scanning principle. In the case of rotation of the linear graduation around an axis crosswise to the direction of measurement (for example in connection with a wavy graduation), the meeting point of the two diffraction beams is displaced in the direction of measurement by a certain amount, which is directly introduced into the measured result in the form of a measurement error.

Therefore, it is an object of the present invention to compensate for wobble errors or tip errors occurring in photoelectric position measuring devices in a simple way by providing an optical deflection element so that accurate measurement results are obtained.

SUMMARY OF THE INVENTION

A photoelectric position measuring device for measuring the relative position of a first object and a second object impinges a beam of light from a light source onto a graduated scale. The graduated scale includes a graduation. The light beam impinges the scale outside of the graduation. The beam is reflected and impinges on a first graduation area. A deflection prism is used to direct the beam onto the first graduation area. The beam is diffracted on the first area and the diffracted beams impinge on a second diffraction area. The angle at which the beams impinge the second graduation area are identical to the angle at which the beam is diffracted at the first graduation area. The beams meeting at the second graduation area are brought to interference. The interference is detected and periodic signals representing the measured values are generated.

BRIEF DESCRIPTION OF THE DRAWINGS

Further objects and advantages of this invention will become more apparent and readily appreciated from the following detailed description of the present invention, taken in conjunction with the accompanying drawings of which:

FIG. 1 is a cross-sectional view of a photoelectric angle measuring device according to a first preferred embodiment of the present invention;

FIG. 2 is a top view of the measuring device shown in FIG. 1;

FIG. 3 is a side view of the measuring device shown in FIG. 1;

FIG. 4 is a cross-sectional view of a photoelectric length measuring device according to a second preferred embodiment of the present invention; and FIG. 5 is a side view of the measuring device shown in FIG. 4.

DETAILED DESCRIPTION OF THE PRESENTLY PREFERRED EMBODIMENTS

The preferred embodiments of the present invention will hereinafter be described in detail with reference to the accompanying drawings. FIG. 1 is a cross-sectional view of a photoelectric angle measuring device in accordance with a first embodiment of the present invention. The photoelectric angle measuring device is used to measure the relative position of two objects, for example, two machine parts of a machine tool (not shown). A graduated scale 2, mounted on a rotating shaft 1 is rotatable in either a clockwise or counter clockwise direction as shown by arrow X in FIG. 2. The scale is in the shape of a circular, flat graduated disk. The scale 2 has an incremental angular graduation 4 in the shape of a phase grid located on the periphery of the scales's reflecting surface 3. The angular graduation 4 is scanned by means of a scanning unit connected with a second, stationary object. The scanning unit comprises a light source 5 in the form of a laser, a deflection prism 6, an optical deflection element 7 in the form of a triple prism, and a photoelectric cell 8.

A light beam 9, drawn as a solid line, emanating from the light source 5 impinges on the surface 3 of the graduated disk 2 at point A outside the angular graduation 4. The beam 9 is reflected by the surface 3 and deflected twice by the triple prism 7. A triple prism is one form of an optical deflection element known to those skilled in the art. A triple prism consists of three individual mirrors meeting in a corner. The beam impinges on an impact point B on the angular graduation 4 in a first angular graduation area 10. The beam 9 impinging on point B is parallel to the beam 9 reflected from point A. The light beam 9 is split at the impact point B, while being reflected and diffracted at two identical diffraction angles, by the phase grid of the angular graduation 4 into two diffraction beams of the first order 9a and 9b. The two beams 9a and 9b have a common plane parallel to the impinging light beam 9.

The two beams 9a and 9b pass through the deflection prism 6, each beam reflected twice on the deflection prism's side walls. The two beams 9a and 9b meet at identical, associated diffraction angles at a meeting point C in a second angular graduation area 11 of the angular graduation 4. The second angular graduation area 11 is located diametrically opposite to the first angular graduation area 10. The two diffraction beams 9a and 9b, generated in the first angular graduation area 10, each impinge the second angular graduation area 11 with diffraction angles of opposite signs. After being diffracted and reflected by the phase grid of the angular graduation 4, a light beam 9 emanates from the second angular graduation area 11. The light beam 9 is generated by interference of the two diffraction beams 9a and 9b. The light beam 9 emanating from the second graduation area 11 is parallel and oppositely directed to the light beam 9 impinging on the first angular graduation area 10 at point B. The light beam 9, reflected from the second angular graduation area 11, impinges on the photoelectric cell 8, which generates a periodic scanning signal 12 when the graduated disk 2 is rotated. The angular measured values for the angular position of the two objects, which are rotatable with respect to each other, are generated in a known manner in an evaluating device 13 located downstream of the photoelectric cell 8.

The above description pertains to an ideal beam path that occurs with the exact vertical placement of the graduated disk 2 on the rotating shaft 1. This, however, is not generally achieved because of production parameters. Wobble errors are generated by the wobbling of the rotating graduated disk 2 on the rotating shaft 1 which lead to inaccurate measurements. As mentioned above, because of this wobbling, the meeting point C of the two diffraction beams 9a and 9b in the second angular graduation area 11 wanders in a tangential and radial direction. Thus, without the deflection element 7, the impact point B of the light beam 9 in the first angular graduation area 10 and the meeting point C of the two diffraction beams 9a and 9b in the second angular graduation area 11 are no longer located on the same radius. The phase constant of the incremental angular graduation 4 depends on the radius therefore different grid constants are scanned in the two angular graduation areas 10 and 11. This results in a diffraction angle dispersion of the two diffraction beams and thus in deterioration of the contrast of the interference of the two diffraction beams.

The inexact placement of the graduated disk 2 on the rotating shaft 1 is illustrated by the dashed lines in FIG. 1. The following description will be with reference to the graduated disk 2 illustrated by the dashed lines. Under this condition the light beam 9 emanating from the light source 5 does not impinge the surface 3 of the horizontally extending graduated disk 2 at point A outside the angular graduation 4. Instead the light beam 9 impinges at point A' located outside the angular graduation 4 on the graduated disk 2. A reflected beam path shown in dashed lines is the result. Following double deflection by the triple prism 7, the light beam 9' reflected at point A' on the surface 3 of the graduated disk 2 impinges parallel to itself at the impact point B' on the angular graduation 4 of the graduated disk 2 in the first angular graduation area 10. The light beam 9' is split into two diffraction beams of the first order 9a' and 9b', while being reflected and diffracted at two identical diffraction angles by the phase grid of the angular graduation 4. The common plane of the beams 9a' and 9b' now extend parallel to the impinging light beam 9 and they pass through the deflection prism 6 in accordance with FIG. 1. The beams 9a' and 9b' are each reflected on the deflection prism's side walls. The beams 9a' and 9b' are parallel to the diffraction beams 9a and 9b and meet at identical, associated diffraction angles at a meeting point C' in the second angular graduation area 11 of the graduated disk 2.

In the prior art the diffraction beams 9a' and 9b' would not be parallel to the diffraction beams 9a and 9b so that the wobble errors mentioned above would occur. In the present invention the diffraction beams 9a' and 9b' are parallel to the diffraction beams 9a and 9b so there are no errors caused by the disk 2 wobbling on the shaft 1. The two diffraction beams 9a' and 9b', generated in the first angular graduation area 10 each impinge in the second angular graduation area 11 at diffraction angles with opposite signs on the angular graduation 4 of the graduated disk 2. A light beam 9' generated by interference of the two diffraction beams 9a' and 9b' emanates after being diffracted and reflected from the second angular graduation area 11. The light beam 9' emanating from the second graduation area 11 is parallel to the light beam 9' impinging at point B' of the first angular graduation area 10. The light beam 9' reflected from the second angular graduation area 11 impinges on the photoelectric cell 8. The photoelectric cell 8 generates the periodic scanning signal 12 when the graduated disk 2 is rotated. The angular measured values for the angular position of the two objects, which are rotatable with respect to each other are generated in a known manner in the evaluating device 13 located downstream of the photoelectric cell 8.

The meeting point C' of the two diffraction beams 9a' and 9b' of the wobbly graduated disk 2 is radially and tangentially displaced in relation to the meeting point C of the two diffraction beams 9a and 9b of the non-wobbly graduated disk 2. In a momentary position of the graduated disk 2 in accordance with FIG. 1 there is a distance "b" between the two meeting points C and C'. The distance "a" between the impact point B and the impact point B' in the first angular graduation area 10 is equal to the distance "b" in the second angular graduation area 11. The impact point B and the meeting point C of the ideal beam path and the impact point B' and the meeting point C' of the beam path in case of the wobbly graduated disk 2 are always located on the same radius so that wobble errors do not effect the measured result.

FIG. 4 is a cross-sectional view of a photoelectric length measuring device in accordance with a second embodiment of the present invention. The photoelectric length measuring device is used to measure the relative position of two objects for example, two machine parts of a machine tool (not shown). A linear scale 22, connected with the displaceable object and longitudinally displaceable in the measuring direction X, has an incremental linear graduation 24 in the shape of a phase grid on its reflecting surface 23. This linear graduation 24 is scanned by a scanning unit connected with the second, stationary object. The scanning unit comprises a light source 25 in the form of a laser, a deflection prism 26, an optical deflection element 27 in the form of a triple prism, and a photoelectric cell 28.

A light beam 29, drawn in a solid line, emanating from the light source 25 impinges the surface 23 of the graduated scale 22 at point D outside the linear graduation 24. The beam 29 is reflected by the surface 23 and deflected twice by the triple prism 27. The beam 29 impinges on an impact point E on the linear graduation 24 in a first linear graduation area 30. The beam 29 impinging on point E is parallel to the beam 29 reflected from point D. At the impact point E, the light beam 29 is split into two diffraction beams of the first order 29a and 29b, by the phase grid of the linear graduation 24 which reflects and diffracts at two identical diffraction angles. The two beams 29a and 29b have a common plane which is parallel to the impinging light beam 29. The two beams 29a and 29b pass through the deflection prism 26, each being reflected twice on the prism's side walls.

The two beams 29a and 29b meet at identical, associated diffraction angles of a meeting point F in a second linear graduation area 31 of the linear graduation 24. The meeting point F is located at the measuring distance X from the first linear graduation area 30. The two diffraction beams 29a and 29b, generated in the first linear graduation area 30, each impinge with diffraction angles of opposite signs on the second linear graduation area 31. After being diffracted and reflected by the phase grid of the linear graduation 24, a light beam 29 generated by interference of the two diffraction beams 29a and 29b emanates from the second linear graduation area 31. The light beam 29 is parallel and oppositely directed to the light beam 29 impinging on the first linear graduation area 30 at point E. The light beam 29, reflected from the second linear graduation area 31, impinges on the photoelectric cell 28, which generates a periodic scanning signal 32 when the linear graduation scale 22 is moved. The measured values for the relative position of the two objects, are generated in a known manner in an evaluating device 33 located downstream of the photoelectric cell 28.

The above description pertains to an ideal beam path which results from the exact placement of the linear graduated scale 22 parallel to the direction of measurement X. This, however, is not generally achieved in the case of an uneven mounting surface which results in the linear graduation scale 22 being tipped (shown in dashed lines). Because of this tipping of the linear graduation scale 22, tip errors are generated when scanning the linear graduation 24, resulting in inaccurate measurements. Specifically, the meeting point F of the two diffraction beams 29a and 29b in the second linear graduation area 31 is displaced in the measuring direction X. The amount of this displacement directly effects the amount of measurement error.

The following description pertains to a tipped linear graduation scale illustrated by dashed lines in FIG. 4. The light beam 29 emanating from the light source 25 now impinges the surface 23 of the tipped graduation scale 22 outside of the linear graduation 24 resulting in the beam path shown in dashed lines. The light beam 29', reflected at point D' on the surface 23 of the linear graduated scale 22, is deflected twice by the triple prism 27. The beam 29' impinges the linear graduation 4 of the linear graduated scale 22 in the first linear graduation area 30 at impact point E'. The light beam 29' is split at the impact point E', while being reflected and diffracted at two identical diffraction angles, by the phase grid of the linear graduation 24 into two diffraction beams of the first order 29a' and 29b'. The beams 29a' and 29b' have a common plane parallel to the impinging light beam 29. The beams 29a' and 29b' pass through the deflection prism 26 in accordance with FIG. 4. Each beam 29a' and 29b' is reflected twice on the prism's side walls. The beams 29a' and 29b' meet at identical, associated diffraction angles at a meeting point F' in the second linear graduation area 31 of the linear graduated scale 22. The two diffraction beams 29a' and 29b', generated in the first linear graduation area 30 each impinge in the second linear graduation area 31 at diffraction angles with opposite signs. A light beam 29' emanates after being diffracted and reflected from the second linear graduation area 31 and is generated by interference of the two diffraction beams 29a' and 29b'. The beam 29' emanating from the second graduation area 31 is parallel to the light beam 29' impinging on point E' in the first linear graduation area 30'. The light beam 29' reflected from the second linear graduation area 31 impinges on the photoelectric cell 28, which generates the periodic scanning signal 32 when the linear graduated scale 22 is displaced in the measurement direction X. The measured values for the relative position of the two objects are generated in a known manner in an evaluating device 33 located downstream of the photoelectric cell 28.

When deflecting the two diffraction beams 29a' and 29b' from the first linear graduation area 30 to the second linear graduation area 31 of the tipped linear graduated scale 22, their meeting point F' is displaced in relation to the meeting point F of the two diffraction beams 29a and 29b of the non-tipped linear graduated scale 22 by a distance "b'". The distance "a'", generated by the triple prism 27 in the first linear graduation area 30 between the impact point E in case of the non-tipped linear scale and the impact point E' in case of the tipped linear scale is equal to the distance "b'" in the second linear graduation area 31. Thus tip errors do not effect the measured result.

The invention can also be correspondingly used in connection with photoelectric position measuring devices using the transmitted light method.

While this invention has been shown and described in connection with preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A photoelectric position measuring device for measuring the relative position of a first object and a second object comprising:
   a light beam source emitting a beam of light;
   a graduated scale having a graduation, said graduation having a first graduation area and a second graduation area wherein a beam from said source impinges on an area outside of said graduation, said beam being reflected from said scale;
   means for directing said reflected beam onto said first graduation area such that said reflected beam and said impinging beam are parallel to one another wherein said impinging beam is diffracted into diffracted beams in said first graduation area;
   means for impinging said diffracted beams onto said second graduation area wherein said diffracted beams impinge on said second graduation area at angles equivalent to the diffraction angles of said beams in said first area, said beams interfering in said second graduation area; and
   means for detecting said interference and generating signals representing measured values.

2. A measuring device according to claim 1, wherein said means for directing said reflected beam to impinge on said first graduation area comprises a triple prism.

3. A measuring device according to claim 1, wherein said graduation scale comprises a circular graduated disk with an angular graduation, said first angular graduation area being located diametrically opposite to said second angular graduated area.

4. A measuring device according to claim 1 wherein said means for impinging said diffracted beams onto said second graduation area comprises a deflection prism.

5. A measuring device according to claim 1, wherein said graduation comprises a phase grid.

6. A method of measuring the relative position of a first object and a second object using a photoelectric position measuring device comprising the steps of:
   directing a beam of light onto a reflecting surface of a graduated scale wherein said beam is reflected;
   impinging said reflected beam onto a first graduation area of said graduated scale, said impinging beam and said reflected beam being parallel to one another;
   diffracting said impinging beam on said first graduation areas into diffraction beam bundles;
   impinging said diffracted beams onto a second graduation area of said graduated scale wherein said diffracted beams are brought to interference; and
   detecting said interference and generating signals representing movement between said first and second objects.

7. A method according to claim 6 wherein a triple prism is used to impinge said reflected beam onto said first graduation area.

8. A method according to claim 6 wherein said second graduation area is located diametrically opposite said first graduation area.

9. A method according to claim 6 wherein said diffracted beams are deflected twice by a deflection prism before impinging said second graduation area.

* * * * *

UNITED STATES PATENT AND TRADEMARK OFFICE
CERTIFICATE OF CORRECTION

PATENT NO. : 5,111,040
DATED : May 5, 1992
INVENTOR(S) : Harald Bernard et al.

It is certified that error appears in the above-indentified patent and that said Letters Patent is hereby corrected as shown below:

<u>ON THE TITLE PAGE</u>

In the Abstract, in the tenth line, after "first" please delete "the".

In the Abstract, in the twelfth line, delete "meet" and substitute --meets--.

Column 3, line 6, delete "scales's" and substitute --scale's--.

Column 3, line 22, after "A" please insert --.--.

Column 3, line 23, delete ".".

Column 5, line 1, after "C'" please insert --.--.

Column 5, line 9, delete "effect" and substitute --affect--.

Column 6, line 8, delete "effects" and substitute --affects--.

Signed and Sealed this

Fourth Day of October, 1994

Attest:

BRUCE LEHMAN

*Attesting Officer*   *Commissioner of Patents and Trademarks*